United States Patent
Kim et al.

(10) Patent No.: US 12,060,028 B2
(45) Date of Patent: Aug. 13, 2024

(54) FABRIC FOR AIRBAG AND METHOD FOR MANUFACTURING THE SAME

(71) Applicant: KOLON INDUSTRIES, INC., Seoul (KR)

(72) Inventors: Ki Jeong Kim, Seoul (KR); Sang-Mok Lee, Seoul (KR); Gi-Woong Kim, Seoul (KR); Jin Wook Heo, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 265 days.

(21) Appl. No.: 17/767,879

(22) PCT Filed: Dec. 27, 2019

(86) PCT No.: PCT/KR2019/018637
§ 371 (c)(1),
(2) Date: Apr. 9, 2022

(87) PCT Pub. No.: WO2021/132778
PCT Pub. Date: Jul. 1, 2021

(65) Prior Publication Data
US 2023/0322179 A1    Oct. 12, 2023

(51) Int. Cl.
*B60R 21/235* (2006.01)
*D06N 3/14* (2006.01)

(52) U.S. Cl.
CPC .............. *B60R 21/235* (2013.01); *D06N 3/14* (2013.01); *B60R 2021/23514* (2013.01);
(Continued)

(58) Field of Classification Search
CPC .......... B60R 2021/23514; B60R 2021/23519; B60R 21/235; D06M 15/564;
(Continued)

(56) References Cited

U.S. PATENT DOCUMENTS

| 2003/0027474 A1 | 2/2003 | Hayes |
| 2012/0107619 A1 | 5/2012 | Kitagawa |

(Continued)

FOREIGN PATENT DOCUMENTS

| CN | 101081893 A | 12/2007 |
| CN | 101883890 A | 11/2010 |

(Continued)

OTHER PUBLICATIONS

International Search Report dated Sep. 22, 2020.
Covestro Impranil DLU product datasheet, Mar. 1, 2019.

*Primary Examiner* — Arti Singh-Pandey
(74) *Attorney, Agent, or Firm* — Harvest IP Law, LLP

(57) ABSTRACT

This invention relates to fabric for airbag comprising a textile substrate; and a coating layer on at least one side of the textile substrate, wherein coating layer comprises polyurethane resin, a crosslinking agent, and a hydrophilic thickener, and the crosslinking agent is a compound having a blocked active group, and a method for preparing fabric for airbag, comprising steps of: preparing a textile substrate; and forming a coating layer on at least one side of the textile substrate, wherein the step of forming a coating layer comprise steps of: adding a crosslinking agent and a hydrophilic thickener to an aqueous polyurethane dispersion to prepare a coating solution; applying the coating solution on at least one side of the textile substrate; drying the textile substrate on which the coating solution is applied; and heat treating the dried textile substrate.

10 Claims, 1 Drawing Sheet

(52) U.S. Cl.
CPC ............... *B60R 2021/23519* (2013.01); *D06N 2203/068* (2013.01); *D06N 2205/20* (2013.01); *D06N 2211/268* (2013.01)

(58) Field of Classification Search
CPC ......... D06N 2203/068; D06N 2205/20; D06N 2211/268; D06N 3/0077; D06N 3/14
See application file for complete search history.

(56) References Cited

U.S. PATENT DOCUMENTS

| | | |
|---|---|---|
| 2015/0093951 A1 | 4/2015 | Tanaka |
| 2015/0259566 A1 | 9/2015 | Broglie |
| 2016/0090059 A1 | 3/2016 | Tanaka |

FOREIGN PATENT DOCUMENTS

| | | |
|---|---|---|
| CN | 105463855 A | 4/2016 |
| EP | 2666679 A2 | 11/2013 |
| JP | H11240027 A | 9/1999 |
| JP | 2001329468 A | 11/2001 |
| JP | 2009-062643 A | 3/2009 |
| JP | 2012031535 A | 2/2012 |
| JP | 2015-165059 A | 9/2015 |
| JP | 2019-006952 A | 1/2019 |
| JP | 2019-006956 A | 1/2019 |
| KR | 1020040101060 A | 12/2004 |
| KR | 1020070115700 A | 12/2007 |
| KR | 1020130071775 A | 7/2013 |
| KR | 1020160082306 A | 7/2016 |
| KR | 2018-0111037 A | 10/2018 |
| KR | 1020200002234 A | 1/2020 |
| WO | 2017-169388 A1 | 10/2017 |

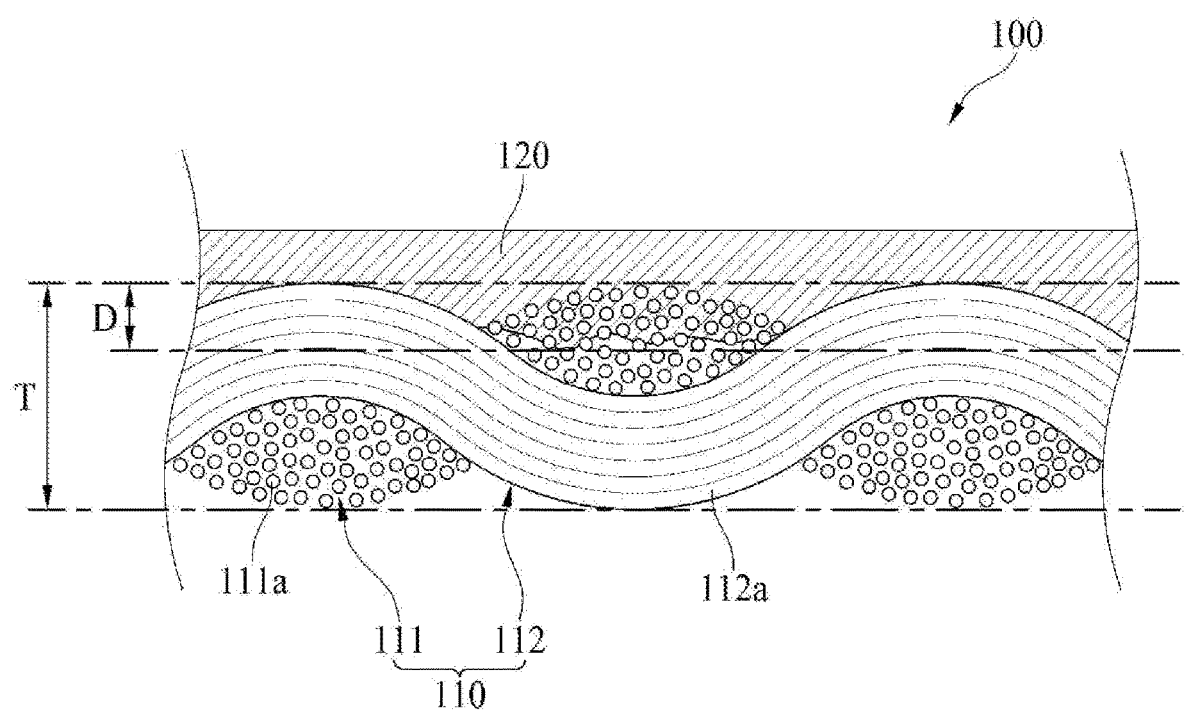

FABRIC FOR AIRBAG AND METHOD FOR MANUFACTURING THE SAME

CROSS REFERENCE TO RELATED APPLICATION(S)

This application is a National Stage of International Application No. PCT/KR2019/018637 filed Dec. 27, 2019, the disclosures of which are incorporated herein by reference in their entireties.

TECHNICAL FIELD

This invention relates to fabric for airbag and a method for preparing the same, and more specifically, relates to fabric for airbag that has excellent air-tightness, and simultaneously has improved durability, and a method for preparing such fabric for airbag with high productivity.

BACKGROUND OF ART

When a shock detection sensor detects shock applied to a vehicle during collision or rollover of vehicle running above a certain speed, airbag is inflated and deployed, thereby protecting a driver and a passenger of the vehicle from the accident.

Fabric for airbag comprises a coating layer for increasing air tightness of fabric, as well as a textile substrate.

In general, inflatable airbag is manufactured by cut and sewing of a textile substrate that is plain weave or basket weave woven, or manufactured by seam-sealing of a seam formed by the cut and sewing with a sealant, or manufactured using one piece woven (OPW) type textile substrate forming a double layer inflation part during a weaving process.

A coating layer formed on a textile substrate is to provide air tightness required for airbag. For example, since a side curtain airbag should be maintained in an inflated shape for a relatively long time (for example, 6 seconds) so as to protect a passenger during roll-over accident, it should have relatively higher air tightness compared to other kinds of airbags.

As the main ingredient of the coating layer, neoprene rubber was used in the initial stage. However, in order to meet high air tightness particularly required for a side curtain fabric, it was required to coat excessively large amount of neoprene rubber. Thus, formation of the coating layer with neoprene rubber was not preferable in terms of production cost and packability of airbag. And, in case the coating layer is formed with neoprene rubber, airbag may become too heavy, thus causing lowering of fuel efficiency of automobiles.

For this reason, recently, silicon resin or polyurethane resin is replacing neoprene rubber. Particularly, due to environmental and cost problems, and the like, use of volatile organic solvents is limited, and thus, interest is growing in an aqueous polyurethane dispersion coating layer.

In general, an aqueous polyurethane dispersion can provide excellent internal pressure retaining property to airbag even with a relatively small amount, compared to silicon resin. However, since an aqueous polyurethane dispersion coating layer has relatively low adhesion with a textile substrate, in case stored for a long time while being packed in an automobile, there is a risk of delamination of the coating layer from the textile substrate. Such delamination of a coating layer makes it impossible for a side curtain airbag to maintain an inflated shape when vehicle roll-over accident occurs.

In order to overcome low durability of airbag comprising an aqueous polyurethane dispersion coating layer, addition of a crosslinking agent to the aqueous polyurethane dispersion coating layer has been suggested.

However, since curing of a coating solution is relatively rapidly progressed immediately after a crosslinking agent is added to an aqueous polyurethane dispersion coating solution, airbag manufacturers should complete a coating process within about two or three hours after adding a crosslinking agent to the coating solution. Namely, in case a coating process is slightly delayed, wasting of materials and productivity decrease may be caused.

And, even if a coating layer is formed with an aqueous polyurethane dispersion coating solution to which a crosslinking agent is added, durability of airbag may not be improved as much as expected.

DETAILED DESCRIPTION OF THE INVENTION

Technical Problem

Thus, the invention relates to fabric for airbag and a method for preparing the same that can meet the above requirements of related technical fields.

One aspect of the invention provides fabric for airbag that has excellent air-tightness, and simultaneously, has improved durability.

Another aspect of the invention provides a method capable of preparing fabric for airbag that has excellent air-tightness, and simultaneously, has improved durability, with high productivity, without wasting materials.

In addition to above-mentioned aspects of the invention, other characteristics and advantages of the invention will be explained below, or can be obviously understood by a person having ordinary knowledge in the art from such explanations.

Technical Solution

According to one aspect of the invention, there is provided fabric for airbag comprising a textile substrate; and a coating layer on at least one side of the textile substrate,
wherein coating layer comprises polyurethane resin, a crosslinking agent, and a hydrophilic thickener, and the crosslinking agent is a compound having a blocked active group.

Penetration level of the coating layer into the textile substrate defined by the following Formula 1, may be 10 to 50%:

$$\text{Penetration level (\%)} = (D/T) \times 100 \quad \text{Formula 1:}$$

wherein, D is the maximum depth of penetration of the coating layer into the textile substrate, and T is the thickness of the textile substrate.

The textile substrate may be fabric comprising warp yarns and weft yarns, and flex abrasion of the airbag fabric, measured according to ISO 5981 standard after aging under temperature of 70±2° C. and relative humidity of 95±2% for 408 hours, may be 1,000 strokes or more, in both warp direction and weft direction.

The hydrophilic thickener may be a non-associative thickener.

The hydrophilic thickener may be a non-newtonian pseudoplastic acryl-based thickener.

The textile substrate may be one piece woven (OPW) type fabric comprising plural warp yarns and weft yarns, each of the warp yarns and weft yarns may have fineness of 210 to 1500 denier, the density of warp yarns and the density of weft yarns may be respectively 40 th/inch to 80 th/inch, based on one layer of the chamber region of the fabric, and each of the warp yarns and weft yarns may comprise at least one of aliphatic polyamide, aromatic polyamide, polyester, and polyolefin.

The blocked active group may comprise a blocking component dissociated from the active group at 100° C. or more.

The active group may be an isocyanate group or a carbodiimide group.

The blocking component may be 3,5-dimethyl pyrazole (DMP), ε-caprolactam, or methylethylketoxime.

The crosslinking agent may be a polyisocyanate compound or a polycarbodiimide compound to which one or more blocking components selected from the group consisting of 3,5-dimethyl pyrazole (DMP), ε-caprolactam, and methylethylketoxime are bonded.

According to another aspect of the invention, there is provided a method for preparing fabric for airbag, comprising steps of: preparing a textile substrate; and forming a coating layer on at least one side of the textile substrate, wherein the step of forming a coating layer comprise steps of: adding a crosslinking agent and a hydrophilic thickener to an aqueous polyurethane dispersion to prepare a coating solution; applying the coating solution on at least one side of the textile substrate; drying the textile substrate on which the coating solution is applied; and heat treating the dried textile substrate, and the crosslinking agent is a compound having a blocked active group.

The blocked active group may comprise a blocking component dissociated from the active group at 100° C. or more. The active group may be an isocyanate group or a carbodiimide group.

The blocking component may be 3,5-dimethyl pyrazole (DMP), ε-caprolactame, or methylethylketoxime.

The crosslinking agent may be a polyisocyanate compound or a polycarbodiimide compound to which one or more blocking components selected from the group consisting of 3,5-dimethyl pyrazole (DMP), ε-caprolactame, and methylethylketoxime are bonded.

The thickener may be a non-associative thickener,

The thickener may be a non-newtonian pseudoplastic acryl-based thickener.

The thickener may have viscosity of 25,000 to 60,000 cps, and the coating solution may have viscosity of 6,000 to 30,000 cps.

The amount of the coating solution applied on at least one side of the textile substrate may be 15 to 50 gsm.

The drying step may be conducted by raising a temperature between 80° C. and 150° C., and the heat treatment step may be conducted at a temperature greater than 150° C.

It should be understood that the above general description and detailed description below are only to illustrate or explain the invention, and they are presented to provide more detailed explanations of the invention described in claims.

Advantageous Effects

By forming a coating layer on a textile substrate with an aqueous polyurethane dispersion capable of providing excellent internal pressure retaining property, and (i) by adding a crosslinking agent and a hydrophilic thickener to an aqueous polyurethane dispersion coating solution, adhesion between the textile substrate and coating layer cam be increased, thus overcoming a durability problem of polyurethane, and (ii) by using a crosslinking agent having a blocked active group as a crosslinking agent, storage stability and pot lifetime of the coating solution may be increased, thus enhancing process efficiency and productivity.

BRIEF DESCRIPTION OF THE DRAWINGS

The drawing attached is to assist in understanding of the invention and construct a part of the specification, and it exemplifies embodiments of the invention, and explains the principle of the invention along with the detailed description of the invention.

FIG. 1 is a cross-sectional view of fabric for airbag according to one embodiment of the invention.

DETAILED DESCRIPTION OF THE EMBODIMENTS

Hereinafter, embodiments of the invention will be explained in detail with reference to attached drawing. However, embodiments described below are presented only as illustrations for clear understanding of the invention, and the scope of the invention is not limited thereby.

It would be obvious to one of ordinary knowledge in the art that various alterations and modifications can be made without departing from the technical idea and scope of the invention. Thus, the invention includes inventions described in the claims and all the alterations and modifications falling within a range of equivalents thereof.

Fabric for airbag (100) according to one embodiment of the invention comprises a textile substrate (110) and a coating layer (120).

According to one embodiment of the invention, the fabric (100) is for side curtain airbag, and the textile substrate (110) is one-piece woven (OPW) type fabric comprising warp yarns (111) and weft yarns (112). The density of warp yarns (111) and the density of weft yarns (112) are respectively 40 to 80 th/inch, based on one layer of the chamber region of the OPW fabric.

The fineness of the each warp yarn and weft yarn (111, 112) should be 210 denier or more so that excellent mechanical property (for example, strength) may be maintained in terms of absorption performance for absorbing high temperature-high pressure deployment energy during airbag deployment. On the other hand, for foldability and weight reduction of airbag, it is preferable that the fineness of each warp yarn and weft yarn (111, 112) is 1500 denier or less.

And, from the point of view of flexibility and smoothness of a coating surface, it is preferable that each of warp yarn and weft yarn (111, 112) is multifilament comprising 72 or more filaments (111a, 112a).

Each of warp yarns (111) and weft yarns (112) may comprise at least one of aliphatic polyamide (for example, nylon 6 or nylon 66), aromatic polyamide (for example, aramid), polyester (for example, PET), and polyolefin (for example, PE or PP).

According to one embodiment of the invention, the coating layer (120) on at least one side of the textile substrate (110) may comprise polyurethane resin, a crosslinking agent and a hydrophilic thickener.

The polyurethane resin of the invention formed by urethane bonding of polyol and isocyanate is a polyol component, and may comprise one or more selected from polycarbonate-based polyol, polyether-based polyol, polyester-based polyol, and silicon-based polyol.

According to one embodiment of the invention, the polyurethane resin may be water dispersible polyurethane resin.

The thickener gives viscosity over a certain level to a coating solution used to form the coating layer (120), thereby improving uniformity of coating and efficiency of the coating process.

According to the invention, the thickener is a hydrophilic thickener. Since the hydrophilic thickener is included as an additive in the coating solution comprising an aqueous polyurethane dispersion as a main component, by wetting effect, polyurethane particles may penetrate better and uniformly into the textile substrate (110) when the medium of the coating solution, water penetrates into the textile substrate (110).

The hydrophilic thickener may be a non-associative thickener that swells the medium of the coating solution, water, and more preferably, it may be a non-newtonian pseudoplastic acryl-based thickener, which is a low shear type, and generates viscosity change when shear stress is applied.

Specifically, the thickener may be a hydrophilic non-associative thickener comprising (meth)acryl functional groups, and such a thickener may be a liquid comprising about 5 to 20 wt % of solid content.

Penetration level of the coating layer (120) into the textile substrate (110) may be 10 to 50%, preferably 25 to 40%. The Penetration level may be defined by the following Formula 1.

Penetration level (%)=(D/T)×100  Formula 1:

wherein, D is the maximum depth of penetration of the coating layer (120) into the textile substrate (110), and T is the thickness of the textile substrate (110). D and T may be measured through SEM photograph of the cross-section of fabric for airbag (100).

If the penetration level of the coating layer (120) is less than 10%, although the fabric for airbag (100) may have excellent flexibility, due to low adhesion between the textile substrate (110) and the coating layer (120), they may be separated from each other when stored in an automobile for a long time. Such delamination of the coating layer makes it impossible for side curtain airbag to be maintained in inflated shape when vehicle rollover accident occurs. According to the invention, since penetration level of the coating layer (120) is 10% or more, flex abrasion of the fabric for airbag (100), measured according to ISO 5981 standard after aging under temperature of 70±2° C. and relative humidity of 95±2% for 408 hours, is 1,000 strokes or more, in both warp direction and weft direction, which means that the coating layer (120) is delaminated from the textile substrate (110) even after 1,000 or more strokes. Such improvement in flex abrasion of fabric for airbag (100) results from the anchoring effect of the coating layer (120) part formed by penetration deeply into the textile substrate (110).

Meanwhile, if penetration level of the coating layer (120) is greater than 50%, stiffness of the fabric for airbag (100) may rapidly increase (namely, flexibility may rapidly decrease), and thus, foldability, tear strength and packability of the airbag may be deteriorated.

Optionally, the coating layer (120) may further comprise a wetting agent (for example, acryl ester-based wetting agent) for facilitating uniform penetration of polyurethane particles into the textile substrate (110), a flame retardant (for example, non-halogen phosphorus-based flame retardant) for improving flame retardancy of fabric for airbag (100), an anti-blocking agent for improving surface property of fabric for airbag (100), and/or a slip agent.

As explained above, the crosslinking agent may be a compound having a blocked active group.

More specifically, the blocked active group may comprise a blocking component dissociated from the active group at 100° C. or more.

The active group may be an isocyanate group or a carbodiimide group.

The blocking component may be 3,5-dimethyl pyrazole (DMP), ε-caprolactame, or methylethylketoxime.

The crosslinking agent may be a polyisocyanate compound or a polycarbodiimide compound to which one or more blocking components selected from the group consisting of 3,5-dimethyl pyrazole (DMP), ε-caprolactame, and methylethylketoxime are bonded.

The polyisocyanate compound is a compound having 2 or more NCO functional groups, and aliphatic, cycloaliphatic, aromatic, araliphatic polyisocyanate or a mixture thereof may be used.

As the polycarbodiimide compound, compounds having carbodiimide equivalent of 200 to 600 may be used. The carbodiimide equivalent means the weight of a polycarbodiimide-based crosslinking agent to the number of moles of carbodiimide groups of the polycarbodiimide-based crosslinking agent.

The polycarbodiimide-based crosslinking agent has long pot life and excellent crosslinking efficiency. As such a polycarbodiimide-based crosslinking agent, Carbodilite V-02, SV-02, V-02-L2, V-04, E-01, E-02, E-03A or E-05, and the like (Nisshinbo Chemical Inc.) may be used.

Hereinafter, a method for preparing fabric for airbag (100) according to one embodiment of the invention will be explained in detail.

The method of the invention comprises steps of: preparing a textile substrate (110); and forming a coating layer (120) on at least one side of the textile substrate (110).

The textile substrate (110) may be one-piece woven (OPW) type fabric comprising warp yarns (111) and weft yarns (112), and the density of warp yarns (111) and the density of weft yarns (112) may be 40 to 80 th/inch, based on one layer of the chamber region of the OPW fabric.

Each of the warp yarn and weft yarn (111, 112) may be multifilament comprising 72 or more filaments (111a, 112a) and having total fineness of 210 to 1500 denier, and may comprise at least one of aliphatic polyamide (for example, nylon 6 or nylon 66), aromatic polyamide (for example, aramide), polyester (for example, PET), and polyolefin (for example, PE or PP).

In general, in order to improve weaving property, a softener or a binder is added to yarn before weaving. Thus, before forming the coating layer (120) on at least one side of the textile substrate (110), in order to remove the softener or binder from the textile substrate (110), steps of refining the textile substrate (110) and washing the refined textile substrate (110) may be further conducted.

In order to form the coating layer (120) on at least one side of the textile substrate (110), a coating solution is prepared first. The coating solution may be prepared by adding a crosslinking agent for increasing adhesion between the textile substrate (110) and coating layer (120), and a thickener for controlling the viscosity of the coating solution to an aqueous polyurethane dispersion.

The water dispersible polyurethane resin of the invention formed by urethane bonding of polyol and isocyanate is a polyol component, and may comprise one or more selected from polycarbonate-based polyol, polyether-based polyol, polyester-based polyol, and silicon-based polyol.

As explained above, since curing of the coating solution is relatively rapidly progressed immediately after a crosslinking agent is added to an aqueous polyurethane dispersion, manufacturers should complete a coating process within about two or three hours after adding the crosslinking agent. Namely, if the coating process is slightly delayed, wasting of materials and productivity decrease may be caused.

In order to solve such a problem, the crosslinking agent has a blocked active group. Since the active group of the crosslinking agent is blocked with a component dissociated at high temperature (for example, 100° C. or more), it takes a substantial amount of time (pot lifetime) until curing begins at room temperature after a crosslinking agent is added to an aqueous polyurethane dispersion. Thus, according to the invention, after adding the crosslinking agent to an aqueous polyurethane dispersion, before practically applying the coating solution to the textile substrate (110), a substantial amount of space time (for example, about 48 hours or more) can be secured.

According to one embodiment of the invention, the active group may be an isocyanate group or a carbodiimide group.

And, according to one embodiment of the invention, the blocking component may be any compound that may be dissociated from the active group only at 100° C. or more, and completely vaporized at a temperature exceeding 150° C. (namely, completely removed during a heat treatment process for curing of the coating solution), and for example, it may be may be 3,5-dimethyl pyrazole (DMP), ε-caprolactame, or methylethylketoxime.

More specifically, the crosslinking agent may be a polyisocyanate compound or a polycarbodiimide compound to which one or more blocking components selected from the group consisting of 3,5-dimethyl pyrazole (DMP), ε-caprolactame, and methylethylketoxime are bonded.

The coating solution may comprise the crosslinking agent in the content of 1 to 5 parts by weight, based on 100 parts by weight of the aqueous polyurethane dispersion.

As explained above, the thickener is a hydrophilic thickener, and allows polyurethane particles to penetrate better and uniformly into the textile substrate (110) when the medium of the coating solution, water penetrates into the textile substrate (110), by wetting effect.

The hydrophilic thickener may be a non-associative thickener that swells the medium of the coating solution, water, and more preferably, it may be a non-newtonian pseudoplastic acryl-based thickener, which is a low shear type, and generates viscosity change when shear stress is applied by a head part of a coating knife.

Specifically, the thickener may be a hydrophilic non-associative thickener comprising (meth)acryl functional groups, and such a thickener may be a liquid comprising about 5 to 20 wt % of solid content.

According to one embodiment of the invention, the hydrophilic additive may have viscosity of 25,000 to 60,000 cps, and it may be added to the aqueous polyurethane dispersion in such an amount to make the viscosity of the coating solution to 6,000 to 30,000 cps If the viscosity of the coating solution is greater than 30,000 cps, it may be difficult to control the amount of a coating solution applied to 50 gsm or less (the reason why the amount of the coating solution applied should be controlled to 50 gsm or less will be explained later), an excessive amount of a thickener may be required, homogeneity decrease may be caused due to high viscosity, and penetration of the coating solution into the textile substrate (110) may become difficult. On the other hand, if the viscosity of the coating solution is less than 6,000 cps, sufficient coating solution may not be applied, desired properties of the coating layer (120) may not be exhibited, and the coating solution may penetrate too deeply into the textile substrate (110) due to capillary phenomenon, thus causing deterioration of foldability and packability of airbag.

The viscosity may be measured with rotary viscometer, and for example, it may be measured with Brookfield DV2T, spindle LV-3 (63) or LV-4 (64), at a speed of 10 rpm.

Optionally, a wetting agent (for example, acryl ester-based wetting agent) for facilitating uniform penetration of polyurethane particles into the textile substrate (110), a flame retardant (for example, non-halogen phosphorus-based flame retardant) for improving flame retardancy of fabric for airbag (100), an anti-blocking agent for improving surface property of fabric for airbag (100), and/or a slip agent, and the like may be further added to the aqueous polyurethane dispersion.

For example, the coating solution may comprise 30 to 60 wt % of solid content, and it may be prepared by adding 1 to 5 parts by weight of a crosslinking agent, 3 to 10 parts by weight of a thickener, to 20 parts by weight of a flame retardant, and 0.1 to 20 parts by weight of other additives (silicon-based anti-blocking agent and/or slip agent) to 100 parts by weight of an aqueous polyurethane dispersion.

Subsequently, the coating solution is applied on at least one side of the textile substrate (110). The coating solution may be uniformly coated on the textile substrate (110) by knife coating or roll coating. A knife coating method may be preferable because it can easily control the amount of coating and enables uniform coating.

According to one embodiment of the invention the amount of the coating solution applied on at least one side of the textile substrate may be 15 to 50 gsm. If the amount applied is less than 15 gsm, internal pressure retaining property may be deteriorated, and if the amount applied is greater than 50 gsm, stiffness of fabric for airbag (100) may rapidly increase (namely, flexibility may rapidly decrease), and thus, foldability and packability of airbag may be deteriorated, and weight reduction of airbag may not be realized.

Next, the textile substrate (110) on which the coating solution is applied is dried. For example, the textile substrate (110) may be dried in a tenter oven.

Through such a drying process (also referred to as 'primary curing'), the water component of the coating solution is evaporated, and simultaneously, the blocking components are dissociated from the active group of the crosslinking agent, and thus, curing of the coating solution is progressed, thereby forming a coating layer (120). In order to prevent damage of the coating layer (120), the drying process may be conducted by raising a temperature between 80° C. and 150° C.

Next, for complete curing of the coating layer (120) (also referred to as 'secondary curing'), the dried textile substrate is heat treated. The heat treatment step may be conducted at a temperature greater than 150° C., for example 155 to 200° C., for 120 to 350 seconds. The blocking components dissociated from the active group during the drying process are vaporized and completely removed during such a heat treatment process.

A cooling process for lowering the temperature of fabric for airbag (100) may be further conducted, for example, using a cooling cylinder (not shown), and the cooled fabric (100) is wound in a winder (not shown).

Hereinafter, the effects of the invention will be explained through specific Examples and Comparative Examples of the invention. However, the following Examples are presented only for better understanding of the invention, and the scope of the right of the invention is not limited thereby.

EXAMPLES AND COMPARATIVE EXAMPLES: PREPARATION OF FABRIC FOR AIRBAG

Example 1

Using polyethylene terephthalate (PET) yarn, OPW textile substrate (warp density: 57th/inch, weft density: 49th/inch) was prepared. The OPW textile substrate was sequentially passed through a refining bath and a washing bath, and then, dried.

To 100 parts by weight of an aqueous polyurethane dispersion, 3 parts by weight of a crosslinking agent IMPRAFIX® 2794 (Covestro) [polyisocyanate blocked with DMP (3,5-dimethyl pyrazole)] and 5 parts by weight of a hydrophilic non-associative acryl-based thickener Borchi® Gel A-LA(Borchers) were added to obtain a coating solution with a viscosity of 15,000 cps.

24 hours after adding the crosslinking agent to the aqueous polyurethane dispersion, the coating solution was uniformly applied on the textile substrate in an amount of 30 gsm by knife coating.

By raising a temperature between 80° C. and 150° C., a drying process was conducted. And then, continuously, in order to give slip property and blocking resistance to a coating surface, a separate top coating was applied, wherein the top coating applied was a silicon-based top coating composition containing talc, and it was transcribed on the surface of a base coating layer using a gravure roller, and then, dried at a temperature of about 150° C. And then, by additionally conducting heat treatment at 180° C., fabric for airbag was completed.

Comparative Example 1

Fabric for airbag was obtained by the same method as Example 1, except that the crosslinking agent was not included in the coating solution.

Comparative Example 2

A textile substrate and a coating solution were respectively obtained by the same method as Example 1, except that a crosslinking agent DESMODUR® N3900 (Covestro) in which an isocyanate group is not blocked was used. And then, it was attempted to apply the coating solution (namely, 24 hours after adding the crosslinking agent to an aqueous polyurethane dispersion, it was attempted to apply the coating solution on the textile substrate), but curing of the coating solution had been already significantly progressed, and thus, coating could not be progressed.

Comparative Example 3

Fabric for airbag was obtained by the same method as Example 1, except that a hydrophobic PU thickener Borchi® Gel L75N (Borchers) was used instead of the hydrophilic non-associative acryl-based thickener.

Experimental Example: Measurement of Properties of Fabric for Airbag

For each airbag fabric of Examples and Comparative Examples prepared above, penetration level of the coating layer and flex abrasion after aging were measured, and the results were shown in the following Table 1.

Experimental Example: Penetration Level of Coating Layer

Fabric samples were cut in a direction parallel to weft yarn. Subsequently, the SEM photograph of the cross-section was taken, and then, the maximum depth (D) of penetration of the coating layer into the textile substrate and the thickness (T) of the textile substrate were respectively measured, and using the measurement values, penetration level of the coating layer of each fabric was calculated according to the following Formula 1.

Penetration level (%)=(D/T)×100        Formula 1:

Experimental Example 2: Flex Abrasion after Aging

Fabric samples were left at a temperature of 70±2° C. and relative humidity of 95±2% for 408 hours, thereby conducting aging. Subsequently, flex abrasions to warp direction and weft direction of the fabric for airbag were respectively measured according to ISO 5981 standard. Specifically, while both ends of the fabric sample were fixed with a clamp, and load of 10 N was applied to the fabric sample, the fabric sample was repeatedly made to reciprocate, and strokes just before the coating layer was peeled off was measured.

TABLE 1

| | | Example 1 | Comparative Example1 | Comparative Example2 | Comparative Example3 |
|---|---|---|---|---|---|
| Coating solution | Crosslinking agent | Blocked polyisocyanate | X | Unblocked polyisocyanate | Blocked polyisocyanate |
| | Thickener | Hydrophilic non-associative acryl-based thickener | Hydrophilic non-associative acryl-based thickener | Hydrophilic non-associative acryl-based thickener | Hydrophobic PU thickener |
| | 180° C. heat treatment | ○ | ○ | — | ○ |
| Fabric for airbag | Penetration level of coating layer (%) | 25 | 23 | — | 5 |
| | Flex abrasion (strokes) Warp direction | 1200 | 500 | — | 300 |
| | Weft direction | 1200 | 300 | — | 300 |

As shown in the Table 1, it was confirmed that in Example 1, the coating solution penetrates into fabric for airbag at relatively high penetration level, and that the finally prepared fabric for airbag has high flex abrasion.

To the contrary, it was confirmed that in Comparative Examples 1 to 3, each coating solution penetrates into fabric for airbag at low penetration level, and thus, flex abrasion of the fabric for airbag is relatively low.

| [DESCRIPTION OF SYMBOLS] | |
|---|---|
| 100: fabric for airbag | 110: textile substrate |
| 111: warp yarn | 112: weft yarn |
| 120: coating layer | |

The invention claimed is:

1. A fabric for airbag comprising;
a textile substrate; and
a coating layer on at least one side of the textile substrate, wherein the coating layer comprises polyurethane resin, a crosslinking agent, and a hydrophilic thickener,
wherein the hydrophilic thickener is a non-associative thickener, and
the crosslinking agent is a compound having a blocked active group,
wherein the crosslinking agent is a polyisocyanate compound or a polycarbodiimide compound to which one or more blocking components selected from the group consisting of 3,5-dimethyl pyrazole (DMP), ε-caprolactam, and methylethylketoxime are bonded.

2. The fabric for airbag according to claim 1, wherein penetration level of the coating layer into the textile substrate defined by the following Formula 1, is 10 to 50%:

Penetration level (%)=(D/T)×100      Formula 1:

wherein, D is the maximum depth of penetration of the coating layer into the textile substrate, and T is the thickness of the textile substrate.

3. The fabric for airbag according to claim 1, wherein the textile substrate is fabric comprising warp yarns and weft yarns, and flex abrasion of the airbag fabric, measured according to ISO 5981 standard after aging under temperature of 70+2° C. and relative humidity of 95+2% for 408 hours, is 1,000 strokes or more, in both warp direction and weft direction.

4. The fabric for airbag according to claim 1, wherein the hydrophilic thickener is a non-Newtonian pseudoplastic acryl-based thickener.

5. The fabric for airbag according to claim 1, wherein the textile substrate is one piece woven (OPW) type fabric comprising plural warp yarns and weft yarns, each of the warp yarns and weft yarns has fineness of 210 to 1500 denier, the density of warp yarns and the density of weft yarns are respectively 40 th/inch to 80 th/inch, based on one layer of the chamber region of the fabric, and each of the warp yarns and weft yarns comprises at least one of aliphatic polyamide, aromatic polyamide, polyester, and polyolefin.

6. A method for preparing fabric for airbag, comprising steps of:
preparing a textile substrate; and
forming a coating layer on at least one side of the textile substrate, wherein the step of forming a coating layer comprise steps of:
adding a crosslinking agent and a hydrophilic thickener to an aqueous polyurethane dispersion to prepare a coating solution;
applying the coating solution on at least one side of the textile substrate;
drying the textile substrate on which the coating solution is applied; and
heat treating the dried textile substrate, and the crosslinking agent is a compound having a blocked active group,
wherein the thickener is a non-associative thickener, and
wherein the crosslinking agent is a polyisocyanate compound or a polycarbodiimide compound to which one or more blocking components selected from the group consisting of 3,5-dimethyl pyrazole (DMP), ε-caprolactam, and methylethylketoxime are bonded.

7. The method for preparing fabric for airbag according to claim 6, wherein the hydrophilic thickener is a non-Newtonian pseudoplastic acryl-based thickener.

8. The method for preparing fabric for airbag according to claim 6, wherein the thickener has viscosity of 25,000 to 60,000 cps, and the coating solution has viscosity of 6,000 to 30,000 cps.

9. The method for preparing fabric for airbag according to claim 6, wherein the amount of the coating solution applied on at least one side of the textile substrate is 15 to 50 gsm.

10. The method for preparing fabric for airbag according to claim 6, wherein the drying step is conducted by raising a temperature between 80° C. and 150° C., and the heat treatment step is conducted at a temperature greater than 150° C.

* * * * *